United States Patent
Sato

(10) Patent No.: US 10,609,201 B2
(45) Date of Patent: *Mar. 31, 2020

(54) MONITORING APPARATUS AND CONTROL METHOD

(71) Applicant: CANON KABUSHIKI KAISHA, Tokyo (JP)

(72) Inventor: Junji Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 15/203,598

(22) Filed: Jul. 6, 2016

(65) Prior Publication Data

US 2017/0013110 A1 Jan. 12, 2017

(30) Foreign Application Priority Data

Jul. 8, 2015 (JP) .................................. 2015-136664

(51) Int. Cl.
*H04M 1/725* (2006.01)
*H04W 12/06* (2009.01)
*H04L 29/06* (2006.01)
*H04W 12/00* (2009.01)
*H04L 12/24* (2006.01)

(52) U.S. Cl.
CPC ........ *H04M 1/72533* (2013.01); *H04L 63/20* (2013.01); *H04W 12/0027* (2019.01); *H04W 12/06* (2013.01); *H04L 41/28* (2013.01)

(58) Field of Classification Search
CPC .......... H04M 1/72533; H04L 43/0876; H04W 12/06
See application file for complete search history.

(56) References Cited

U.S. PATENT DOCUMENTS 7,159,125 B2 * 1/2007 Beadles .................. H04L 63/20
713/168

FOREIGN PATENT DOCUMENTS

| JP | 2004-192625 A | 7/2004 |
| JP | 2006-318207 A | 11/2006 |
| JP | 2013243488 A | * 12/2013 |

* cited by examiner

*Primary Examiner* — Oleg Korsak
(74) *Attorney, Agent, or Firm* — Canon U.S.A., Inc. IP Division

(57) ABSTRACT

When a monitoring task is executed, a management server acquires setting information from a monitoring target device, compares the acquired setting information with setting information for monitoring the monitoring task, and determines whether a difference exists between the acquired setting information and the setting information for monitoring. If a difference exists, the management server performs a process according to a monitoring setting of the monitoring task.

7 Claims, 20 Drawing Sheets

FIG.5

| DEVICE NAME | PRODUCT NAME | IP ADDRESS |
|---|---|---|
| DevA1 | DevA | ipA1 |
| DevA2 | DevA | ipA2 |
| ... | ... | ... |
| DevAx | DevA | ipAx |
| DevB1 | DevB | ipB1 |
| DevB2 | DevB | ipB2 |
| ... | ... | ... |
| DevBx | DevB | ipBx |

FIG.6

```xml
<?xml version="1.0" encoding="UTF-8"?>
<Settings>
  <DeviceInformation>
    <Name>DeviceD</Name>
    <SerialNo>0000000D</SerialNo>
    <ModelName>ModelZ</ModelName>
    ...
  </DeviceInformation>                                           ~601

<PowerManagementSettings>
    <AutoSleepTime>10</AutoSleepTime>
    <DeepSleep>Enabled</DeepSleep>
    ...
  </PowerManagementSettings>                                     ~602

<SecurityPolicySettings Version="1.20">                        ~610

<PolicyPassword>DpQ2kx7U</PolicyPassword>                    ~611

<PolicyItems>
       <Item ID="I0001">false</Item>
       <Item ID="I0002">false</Item>
       <Item ID="I0003">false</Item>
       ...
       <Item ID="I0009">false</Item>
       <Item ID="I0010">true</Item>
    </PolicyItems>                                               ~612

</SecurityPolicySettings>
</Settings>
```

FIG.9

| SETTING INFORMATION NAME | UPDATE DATE AND TIME | . . . |
|---|---|---|
| ⦿ PUBLIC SPACE | 2014/4/1 7:00:45 | . . . |
| ○ HEAD OFFICE DEPARTMENT | 2014/4/2 10:11:09 | . . . |
| . . . | . . . | . . . |

SETTING MONITORING TASK CREATION
(STEP 1: MONITORING TARGET SETTING INFORMATION SELECTION)

OK  CANCEL

FIG.10

SETTING MONITORING TASK CREATION
(STEP 2: MONITORING TARGET DEVICE SELECTION)

MONITORING TARGET SETTING INFORMATION: PUBLIC SPACE

| DEVICE NAME | PRODUCT NAME | INSTALLATION LOCATION | . . . |
|---|---|---|---|
| ☑ DevA1 | DevA | IN FRONT OF 1ST-FLOOR RECEPTION DESK | . . . |
| ☑ DevA2 | DevA | 1ST-FLOOR LOBBY | . . . |
| ☐ DevB1 | DevB | MEETING ROOM A | . . . |
| . . . | . . . | . . . | . . . |

OK    CANCEL

FIG.12

| SECURITY POLICY MONITORING TASK CREATION
(STEP 1: MONITORING TARGET SETTING INFORMATION SELECTION) |||||
|---|---|---|---|---|
| SETTING INFORMATION NAME | SECURITY POLICY VERSION | UPDATE DATE AND TIME | . . . ||
| ⦿ PUBLIC SPACE | V1.20 | 2014/4/1 7:00:45 | . . . |
| ○ HEAD OFFICE DEPARTMENT | V1.10 | 2014/4/2 10:11:09 | . . . |
| . . . | . . . | . . . | . . . |

OK   CANCEL

FIG.13

SECURITY POLICY MONITORING TASK CREATION
(STEP 2: MONITORING TARGET DEVICE SELECTION)

MONITORING TARGET SETTING INFORMATION: PUBLIC SPACE

| DEVICE NAME | COMPATIBLE SECURITY POLICY VERSION | PRODUCT NAME | INSTALLATION LOCATION | ... |
|---|---|---|---|---|
| ☑ DevA1 | V1.20, V1.30 | DevA | IN FRONT OF 1ST-FLOOR RECEPTION DESK | ... |
| ☑ DevA2 | V1.10, V1.20 | DevA | 1ST-FLOOR LOBBY | ... |
| ☐ DevB1 | V1.00 | DevB | MEETING ROOM A | ... |
| ... | ... | ... | ... | ... |

OK    CANCEL

FIG.14

SECURITY POLICY MONITORING TASK CREATION
(STEP 5: POLICY PASSWORD INPUT)

MONITORING TARGET SETTING INFORMATION: PUBLIC SPACE

DevA1:  DpQ2kx7U

DevA2:  Buw5j2qg

OK   CANCEL

FIG.17A

```
<?xml version="1.0" encoding="UTF-8"?>
<Settings>
  <DeviceInformation>                          ─── 1701
    <ModelName>ModelZ</ModelName>
    ...
  </DeviceInformation>

<PowerManagementSettings>                    ─── 1702
    <AutoSleepTime>10</AutoSleepTime>
    <DeepSleep>Enabled</DeepSleep>
    ...
  </PowerManagementSettings>
</Settings>
```

FIG.17B

```
<?xml version="1.0" encoding="UTF-8"?>
<Settings>
  <DeviceInformation>                          ─── 1701
    <ModelName>ModelZ</ModelName>
    ...
  </DeviceInformation>

<SecurityPolicySettings Version="1.20">      ─── 1703

<PolicyPassword></PolicyPassword>          ─── 1704

<PolicyItems>                              ─── 1705
      <Item ID="I0001">true</Item>
      <Item ID="I0002">false</Item>
      <Item ID="I0003">false</Item>
      ...
      <Item ID="I0009">false</Item>
      <Item ID="I0010">true</Item>
    </PolicyItems>

</SecurityPolicySettings>
</Settings>
```

FIG.18A

```xml
<?xml version="1.0" encoding="UTF-8"?>
<Settings>
  <DeviceInformation>                                    ─ 1701
    <ModelName>ModelZ</ModelName>
    ...
  </DeviceInformation>

<PowerManagementSettings>                              ─ 1802
    <AutoSleepTime>10</AutoSleepTime>
    <AutoShutdownTime>300</AutoShutdownTime>
    <DeepSleep>Enabled</DeepSleep>
    ...
  </PowerManagementSettings>
</Settings>
```

FIG.18B

```xml
<?xml version="1.0" encoding="UTF-8"?>
<Settings>
  <DeviceInformation>                                    ─ 1701
    <ModelName>ModelZ</ModelName>
    ...
  </DeviceInformation>

<SecurityPolicySettings Version="1.20">                ─ 1703

<PolicyPassword></PolicyPassword>                    ─ 1704

<PolicyItems>                                        ─ 1805
      <Item ID="I0001">false</Item>
      <Item ID="I0002">false</Item>
      <Item ID="I0003">false</Item>
      ...
      <Item ID="I0009">false</Item>
      <Item ID="I0010">true</Item>
      <Item ID="I0011">true</Item>
    </PolicyItems>

</SecurityPolicySettings>
</Settings>
```

FIG.20

```
<?xml version="1.0" encoding="UTF-8"?>
<Settings>

<DeviceInformation>                                    ~1701
    <ModelName>ModelZ</ModelName>
    ...
  </DeviceInformation>

<SecurityPolicySettings Version="1.30">                ~2003

<PolicyPassword></PolicyPassword>                    ~1704

<PolicyItems>
      <Item ID="I0001">false</Item>
      <Item ID="I0002">false</Item>                      ~2005
      <Item ID="I0003">false</Item>
      ...
      <Item ID="I0009">false</Item>
      <Item ID="I0010">true</Item>
    </PolicyItems>

</SecurityPolicySettings>
</Settings>
```

MONITORING APPARATUS AND CONTROL METHOD

BACKGROUND

Field

Aspects of the present invention generally relate to a technique for remote monitoring control of setting information of a network device.

Description of the Related Art

Conventionally, a technique exists where an information technology (IT) administrator remotely monitors whether a value of a setting made for each of a plurality of devices, such as image forming apparatuses, present on a network is changed to an unintended setting value.

For example, in Japanese Patent Application Laid-Open No. 2006-318207, a setting stored in a management server and a setting acquired from a device of a monitoring target are compared with each other. If the settings are different from each other, the setting stored in the management server is distributed to the device to change the setting of the device back to normal, thereby achieving a stable operation of the device.

Further, in Japanese Patent Application Laid-Open No. 2004-192625, the period of monitoring a setting of a device is set, and if an attempt is made to change the setting during the monitoring period, a change request is rejected, or a notification is provided to a user having set the monitoring, thereby preventing the setting of the device from being inadvertently changed.

In recent years, to ensure use according to the network environment and the security guidelines of an office environment, the function of managing setting information for forcibly preventing a setting regarding security from being changed has been provided in various devices. Such a function is generally termed a security policy.

Normally, to change a security policy, user authority superior to that for changing a setting in a conventional manner and a special password are required. However, a user having such authority may inadvertently change the security policy. Thus, the function of monitoring the security policy similarly to conventional setting monitoring is necessary. At this time, the security levels of the setting and the security policy are different from each other. Thus, the determination of whether to notify an administrator of a detected change or update a changed value to the previous value should also differ.

If the administrator is not appropriately notified of a change in the setting or the security policy, or a changed value is not appropriately updated to the previous value, this may hinder the monitoring work of the administrator and the maintenance of the security of a network device. For example, a large number of unnecessary notifications may be transmitted to the administrator, influencing the work of the administrator, and raising management costs. Further, the following situations may occur that threaten the security of the network device. For example, the administrator is not notified of a change in which the security risk is high, which the administrator should be notified of. Further, when the value of an item in which the security risk is high should be changed back to the previous value, the value is not changed back to the previous value.

SUMMARY

According to an aspect of the present invention, a monitoring apparatus for communicating with a network device compatible with a management function for preventing a value of a particular item from being changed without predetermined authentication includes a control unit configured to control execution of a monitoring task for monitoring setting information of a network device of a monitoring target, the setting information including a plurality of items and values of the items, an acquisition unit configured to, when the monitoring task is executed, acquire the setting information of the network device of the monitoring target, a determination unit configured to compare the setting information acquired by the acquisition unit with setting information for monitoring the monitoring task and determine whether a difference exists between the acquired setting information and the setting information for monitoring, and a processing unit configured to, in a case where the determination unit determines that a difference exists, execute a process according to a monitoring setting of the monitoring task, wherein in a case where the monitoring task is a task for monitoring regarding the management function, the determination unit determines that a difference exists in an item included in the setting information for monitoring but not included in the acquired setting information, wherein in a case where the monitoring task is not a task for monitoring regarding the management function, the determination unit determines that no difference exists in the item, and wherein the determination unit further compares values of an item included in both the setting information for monitoring and the acquired setting information to determine whether a difference in the item exists.

Further features of aspects of the present invention will become apparent from the following description of exemplary embodiments with reference to the attached drawings.

BRIEF DESCRIPTION OF THE DRAWINGS

FIG. 5 is a diagram illustrating an example of a device search result.

FIG. 6 is a diagram illustrating an example of a device configuration file acquired from the device.

FIG. 9 is an example of a screen for selecting device setting information to be a monitoring target in a setting monitoring task.

FIG. 10 is an example of a screen for selecting a device to be a monitoring target in the setting monitoring task.

FIG. 12 is an example of a screen for selecting device setting information to be a monitoring target in a security policy monitoring task.

FIG. 13 is an example of a screen for selecting a device to be a monitoring target in the security policy monitoring task.

FIG. 14 is an example of a screen for inputting a security policy password.

FIGS. 17A and 17B are diagrams illustrating examples of a monitoring device configuration file.

FIGS. 18A and 18B are diagrams illustrating examples of a monitoring device configuration file.

FIG. 20 is a diagram illustrating an example of a monitoring device configuration file.

DESCRIPTION OF THE EMBODIMENTS

Exemplary embodiments for carrying out the present invention will be described below with reference to the drawings.

Figure 1:
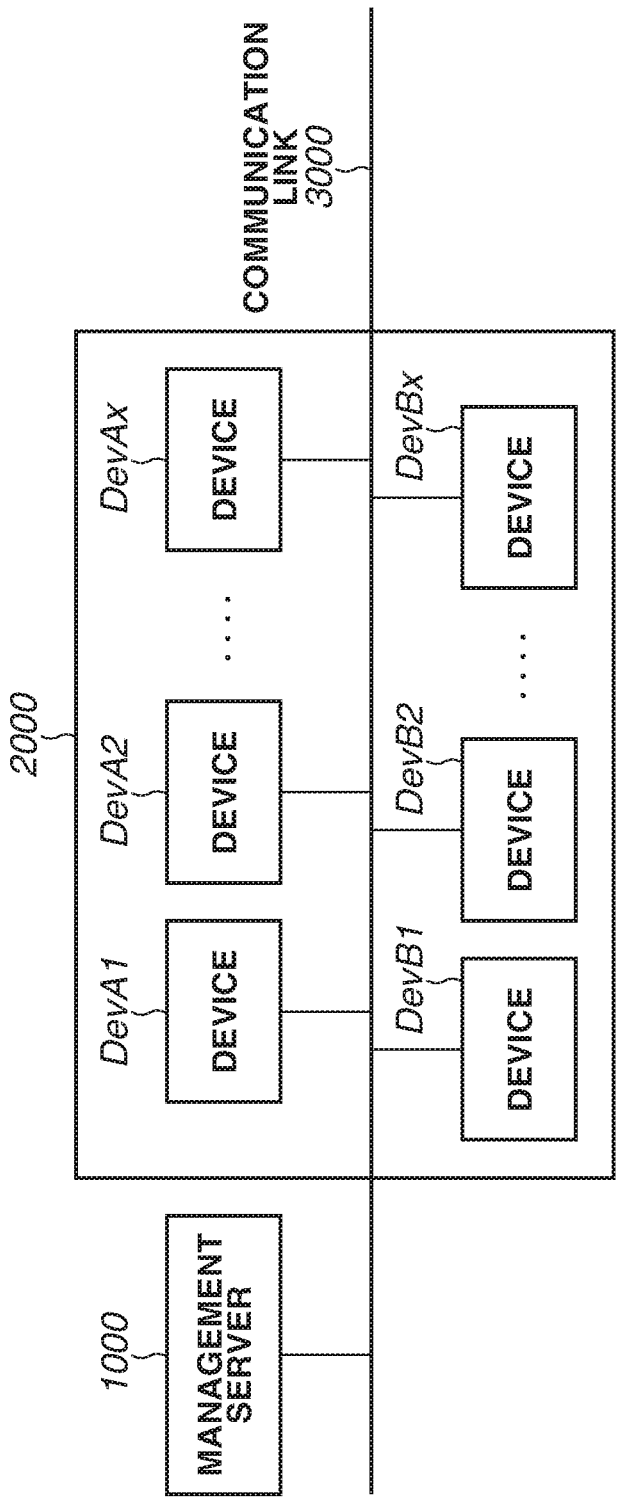
FIG. 1 is a diagram illustrating a configuration of a device management system including a management server according to the present exemplary embodiment.

A first exemplary embodiment is described. FIG. 1 is a diagram illustrating an example of the configuration of a device management system including a monitoring apparatus according to an exemplary embodiment of the present invention.

As illustrated in FIG. 1, the device management system according to the present exemplary embodiment includes a management server 1000 and devices 2000 (DevA1 to DevAx and DevB1 to DevBx). Hereinafter, the devices DevA1 to DevAx and DevB1 to DevBx will be collectively referred to as the "devices 2000". The management server 1000 and the devices 2000 are connected to each other via a communication link 3000. In a large-scale device management system, the number of devices 2000 can be several hundreds to several tens of thousands.

Figure 3:
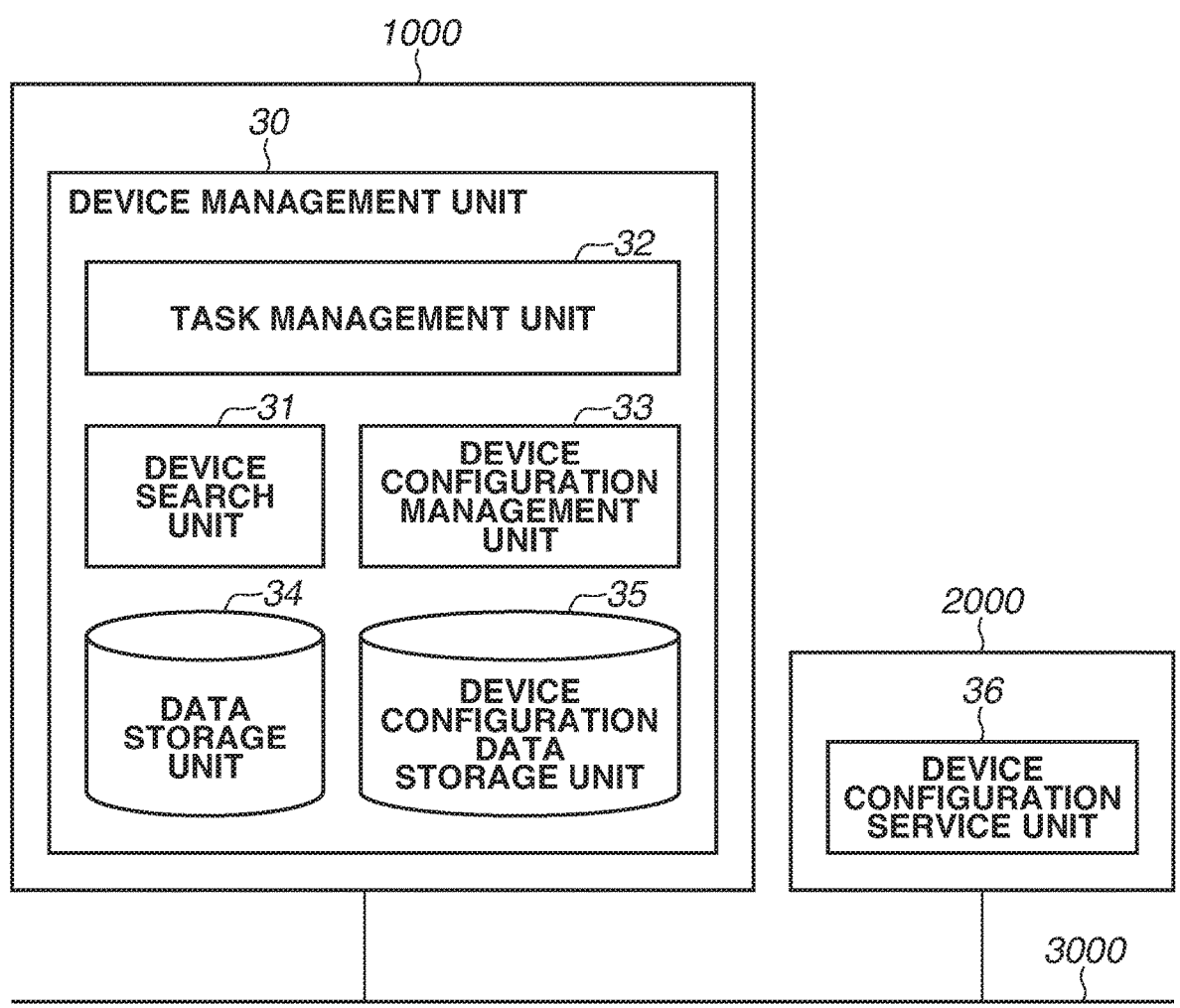
FIG. 3 is a software configuration diagram of the management server and a device.

The management server 1000 is a server operated by a device management unit 30 illustrated in FIG. 3 to manage the devices 2000, and corresponds to the monitoring apparatus according to aspects of the present invention.

Each device 2000 is a network device operated by a device configuration service unit 36 illustrated in FIG. 3. A network device according to aspects of the present invention supports the function of managing setting information (a security policy) for forcibly preventing a setting regarding security from being changed. To change the version of a security policy to be applied or change an item corresponding to a security policy or the setting value of the item, special authentication is required.

For the special authentication, user authority superior to that for changing a general setting value that does not correspond to the security policy, and a special password (a security policy password) are required.

The device 2000 is a network device such as an image forming apparatus (a printer, a scanner, a facsimile, or a multifunction peripheral), an information processing apparatus (a personal computer (PC), a tablet terminal, or a smartphone), a network camera, a digital medical device, a robot, an in-car terminal, an air-conditioning device, or another network household electrical appliance.

Figure 2:
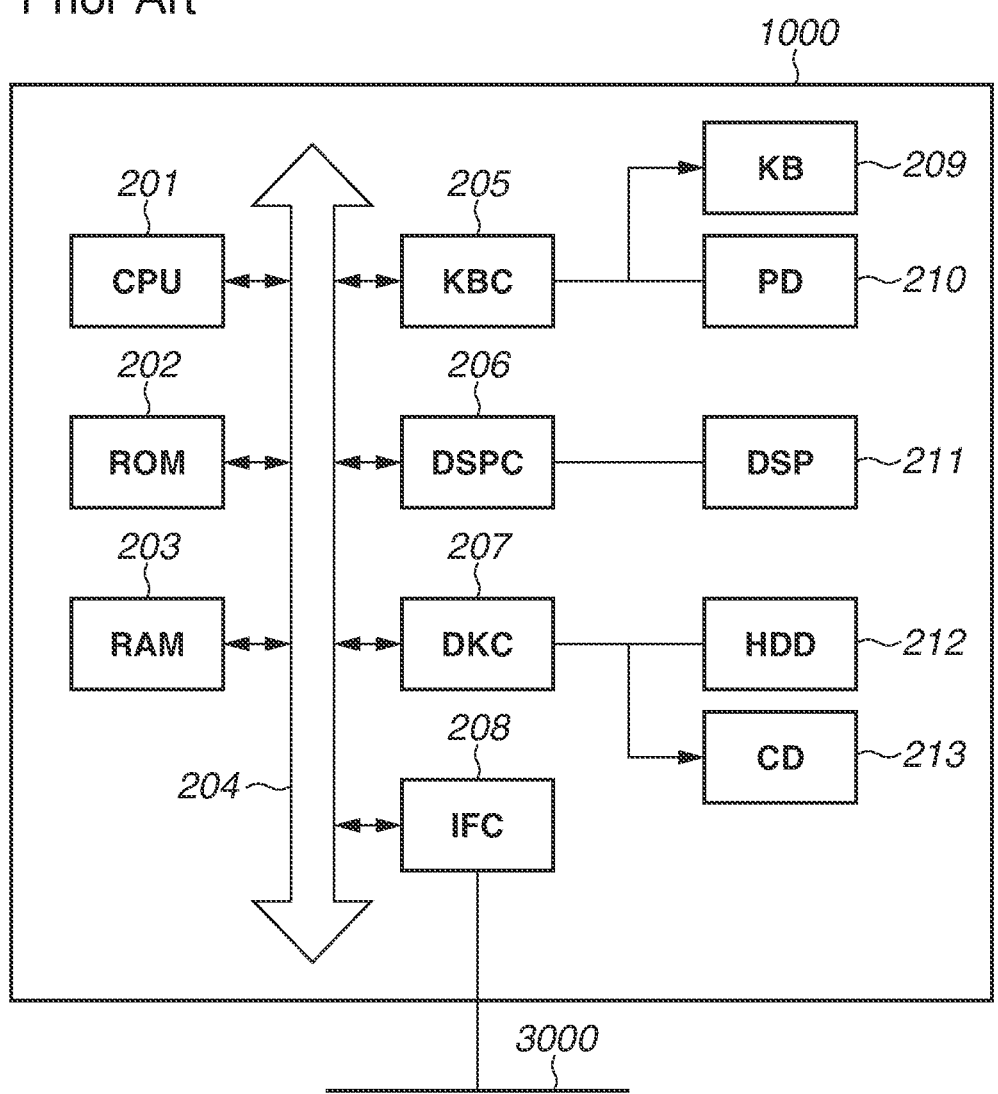
FIG. 2 is a hardware configuration diagram of the management server.

FIG. 2 is a diagram illustrating an example of the hardware configuration of the management server 1000.

In FIG. 2, a central processing unit (CPU) 201 loads a program stored in a read-only memory (ROM) 202 or a hard disk drive (HDD) 212 into a random-access memory (RAM) 203, where necessary, and executes the program, thereby executing various types of control. The HDD 212 stores a program of device management software according to the present exemplary embodiment that performs operations on software in all the following descriptions, and the CPU 201 executes the program.

The CPU 201 performs execution on hardware in all the following descriptions unless otherwise noted. On the other hand, as described above, the device management software (device management program) stored in the HDD 212 performs control on software. That is, the CPU 201 reads and executes the device management program recorded in a computer-readable manner in the HDD 212, thereby achieving the functions of the management apparatus 1000.

The ROM 202 stores the Basic Input/Output System (BIOS) and a boot program. The RAM 203 functions as a main memory or a work area for the CPU 201. A keyboard controller (KBC) 205 controls an instruction input from a keyboard (KB) 209 or a pointing device (PD) 210. A display controller (DSPC) 206 controls the display of a display (DSP) 211.

A disk controller (DKC) 207 controls access to a storage device such as the HDD 212 or a Compact Disc Read-Only Memory (CD-ROM) (CD) 213. The HDD 212 or the CD-ROM (CD) 213 stores a boot program, an operating system (OS), a database, the device management program, and data of these.

An interface controller (IFC) 208 transmits and receives information to and from the device 2000 via the communication link 3000. These components are placed on a system bus 204.

The device management program according to the present exemplary embodiment may be supplied in the form of being stored in a storage medium such as a CD-ROM. In this case, the program is read from a storage medium such as the CD 213 illustrated in FIG. 2 and installed to the HDD 212. Alternatively, instead of or in addition to the HDD 212, another storage device such as a solid-state drive (SSD) may be included.

FIG. 3 is a diagram illustrating an example of the software configurations of the device management unit 30, which operates on the management server 1000, and the device configuration service unit 36, which operates on the device 2000.

Figure 4:
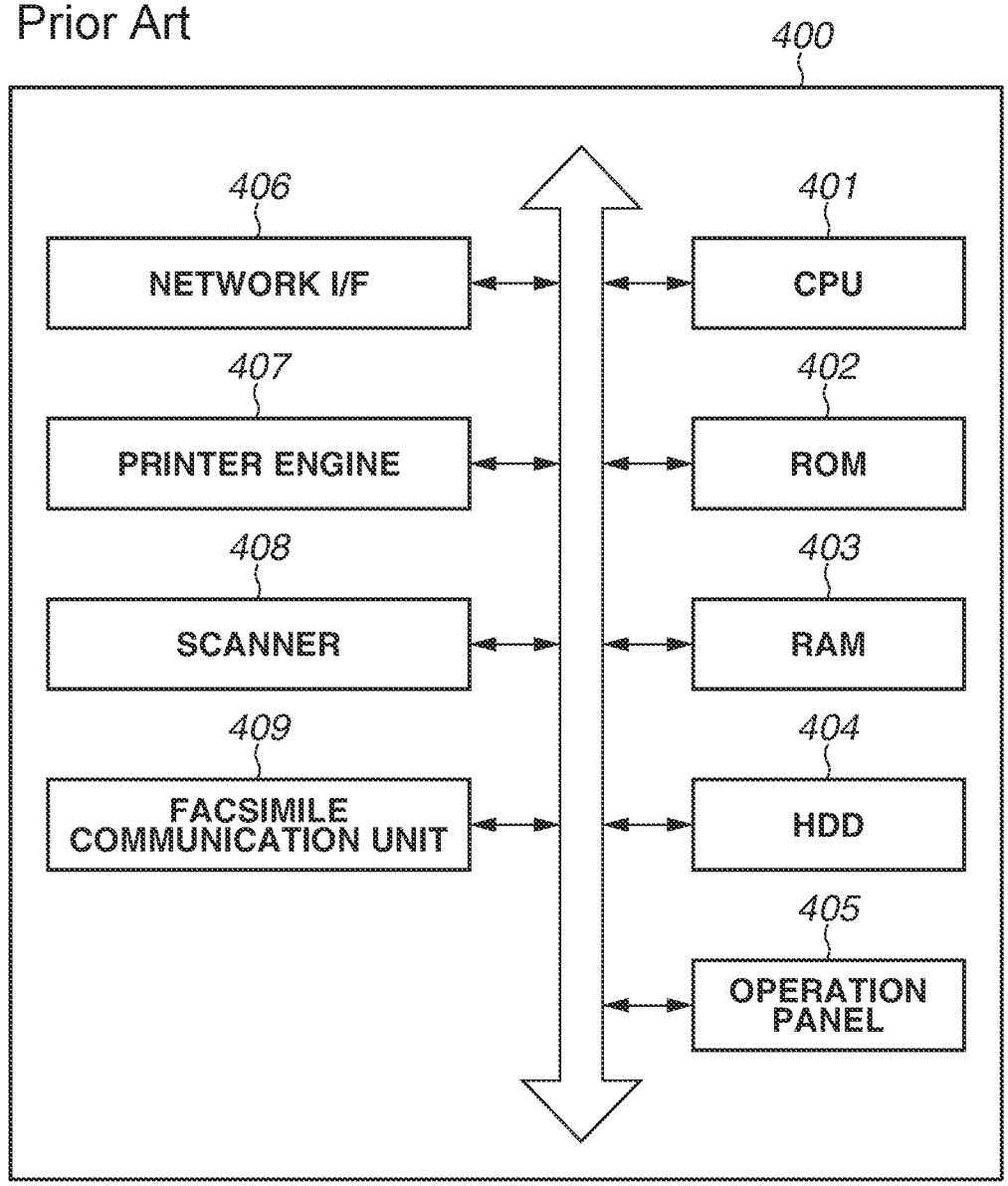
FIG. 4 is a hardware configuration diagram of the device.

The device management unit 30 is a function unit achieved by the CPU 201 of the management server 1000 reading and executing a program stored in the HDD 212. Further, the device configuration service unit 36 is a function unit achieved by a CPU 401 of the device 2000, which is illustrated in FIG. 4, reading and executing a program stored in a ROM 402.

The device management unit 30 includes a device search unit 31, a task management unit 32, a device configuration management unit 33, a data storage unit 34, and a device configuration data storage unit 35. The device management unit 30 can also be implemented as a web-based application. In this case, the device management unit 30 can be used through a web browser on a PC. If the device management unit 30 is implemented as a web-based application, the device management unit 30 controls screens illustrated in FIGS. 7, 9, 10, and 12 to 14, for example, to be displayed on the web browser.

The task management unit 32 has the function of executing a task generated by the device search unit 31 or the device configuration management unit 33 and stored in the data storage unit 34. For the task, a function to be executed by the management server 1000 and an execution condition such as an execution date and time (schedule) are set. The task management unit 32 instructs the device search unit 31 or the device configuration management unit 33 to execute the task according to the schedule set for the task.

The device search unit 31 searches for the device 2000 connected to the communication link 3000, using a known technique such as Simple Network Management Protocol (SNMP), Internet Protocol (IP) broadcast, or Service Location Protocol (SLP) multicast. In the present exemplary embodiment, the device search unit 31 acquires device information such as a device name, a product name, and an IP address as a result of a device search and saves the acquired device information in the data storage unit 34 as illustrated in FIG. 5, for example.

Further, the device search unit 31 has the function of acquiring and changing various pieces of information of the device 2000, using a known technique such as a management information base (MIB) via the communication link 3000.

The device configuration management unit 33 communicates with the device configuration service unit 36 of the device 2000, using a known technique such as Simple Object Access Protocol (SOAP), and acquires various pieces of setting information for forming the device 2000. The setting information also includes a security policy. In the present exemplary embodiment, the device configuration management unit 33 acquires the setting information of the device 2000 in a format termed a device configuration file and stores the acquired device configuration file in the device configuration data storage unit 35.

Further, the device configuration management unit 33 has the function of distributing the device configuration file saved in the device configuration data storage unit 35 to the device 2000.

Further, the device configuration management unit 33 has the function of verifying whether there is a difference between the setting information acquired from the device 2000 and setting information specified as a monitoring target in advance by an administrator (referred to as "monitoring target setting information"), and if there is a difference, performing a predetermined process.

Examples of the predetermined process include "giving an email notification", "performing restoration", and "performing restoration and giving an email notification". "Giving an email notification" indicates the process of notifying by electronic mail the administrator that the value of an item in which there is a difference according to a determination changes in the device 2000. Further, "performing restoration" indicates the process of overwriting with the monitoring target setting information the value, in the device 2000, of an item in which there is a difference according to a determination. Further, "performing restoration and giving an email notification" indicates the process of performing both "giving an email notification" and "performing restoration". The administrator is notified not only by electronic mail but also by a message on a social networking service (SNS) or another notification method.

The device configuration service unit 36 of the device 2000 communicates with the device configuration management unit 33 of the management server 1000, using a known technique such as SOAP, and transmits various pieces of setting information for forming the device 2000 to the management server 1000. Further, the device configuration service unit 36 overwrites the settings of the device 2000 with the monitoring target setting information transmitted from the device configuration management unit 33 of the management server 1000.

FIG. 4 is a diagram illustrating an example of the hardware configuration of the device 2000.

In FIG. 4, an image forming apparatus 400 is an example of the device 2000 and has a print function, a scan function, and a network communication function. A CPU 401 governs the control of the entirety of the image forming apparatus 400. A ROM 402 stores a printing process program to be executed by the CPU 401 and font data. A RAM 403 is used as a work area or a reception buffer for the CPU 401, or used by the CPU 401 to draw an image. An HDD 404 records the setting values of the image forming apparatus 400. Alternatively, instead of or in addition to the HDD 404, another storage device such as an SSD may be included.

An operation panel 405 includes various switches and buttons, a touch panel, and a liquid crystal display unit for displaying a message. On the operation panel 405, it is also possible to change the setting values of the image forming apparatus 400 by a user operation.

A network interface (network I/F) 406 is used to connect to a network. A printer engine 407 performs printing on a recording sheet. A scanner 408 is used to read a document. A facsimile communication unit 409 is used to transmit and receive a facsimile.

FIG. 5 is a diagram illustrating an example of the device search result stored in the data storage unit 34 by the device search unit 31.

In the example of FIG. 5, a device name, a product name, and an IP address are recorded for each device. The device information may be acquired not only by a device search performed by the device search unit 31, but also by being imported from a file in a comma-separated values (CSV) format via the DKC 207.

FIG. 6 is a diagram illustrating an example of the device configuration file acquired from the device 2000 by the device configuration management unit 33. In the example of FIG. 6, the device configuration file holds the setting values of the device 2000 in an Extensible Markup Language (XML) format.

An element 601 represents various pieces of information of the device 2000. In the example of FIG. 6, the element 601 describes a device name, a serial number, and a model name. An element 602 represents settings regarding power management among various pieces of setting information of the device 2000. In the example of FIG. 6, the element 602 describes the time until an automatic transition to a sleep mode, and the setting of whether to enable a so-called deep sleep mode, which consumes lower power.

An element 610 represents a security policy of the device 2000. In the example of FIG. 6, the element 610 describes a security policy version=1.20. The security policy version is information for identifying the configuration of the security policy. If the security policy version differs, the items of the security policy may differ, or a policy setting value that can be set may differ even in the same item.

An element 611 represents a security policy password. The security policy password is a password that can be set with respect to each device. When the device configuration management unit 33 acquires the device configuration file from the device 2000, the device configuration service unit 36 describes the security policy password on the device configuration file as illustrated in the element 611.

In contrast, when the device configuration management unit 33 distributes the device configuration file to the device configuration service unit 36, the device configuration service unit 36 verifies whether the security policy password 611 on the device configuration file matches a security policy password set for the device 2000. If the security policy passwords match each other, the content of the distributed security policy is reflected on the device 2000. If, on the other hand, the security policy passwords do not match each other, the device configuration service unit 36 returns an error to the device configuration management unit 33.

An element 612 represents each item of the security policy. In the example of FIG. 6, the element 612 describes 10 security policy items with IDs "I0001" to "I0010".

As illustrated in FIG. 6, the setting information of the device 2000 includes general setting information such as the element 602 and setting information (security policy setting information such as the elements 610 to 612) for forcing the general setting information.

The device configuration file may describe, in addition to the setting information illustrated in FIG. 6, any setting information regarding the device 2000, such as print settings and address book settings. Further, the device configuration file does not need to describe all the setting information. For example, the device configuration file may not describe the security policy setting information as illustrated in the elements 610 to 612, or conversely, may describe only the security policy setting information. The determination of what setting information is to be described in the device configuration file is made based on what setting information the device configuration management unit 33 requests the device configuration service unit 36 to output.

Figure 7:
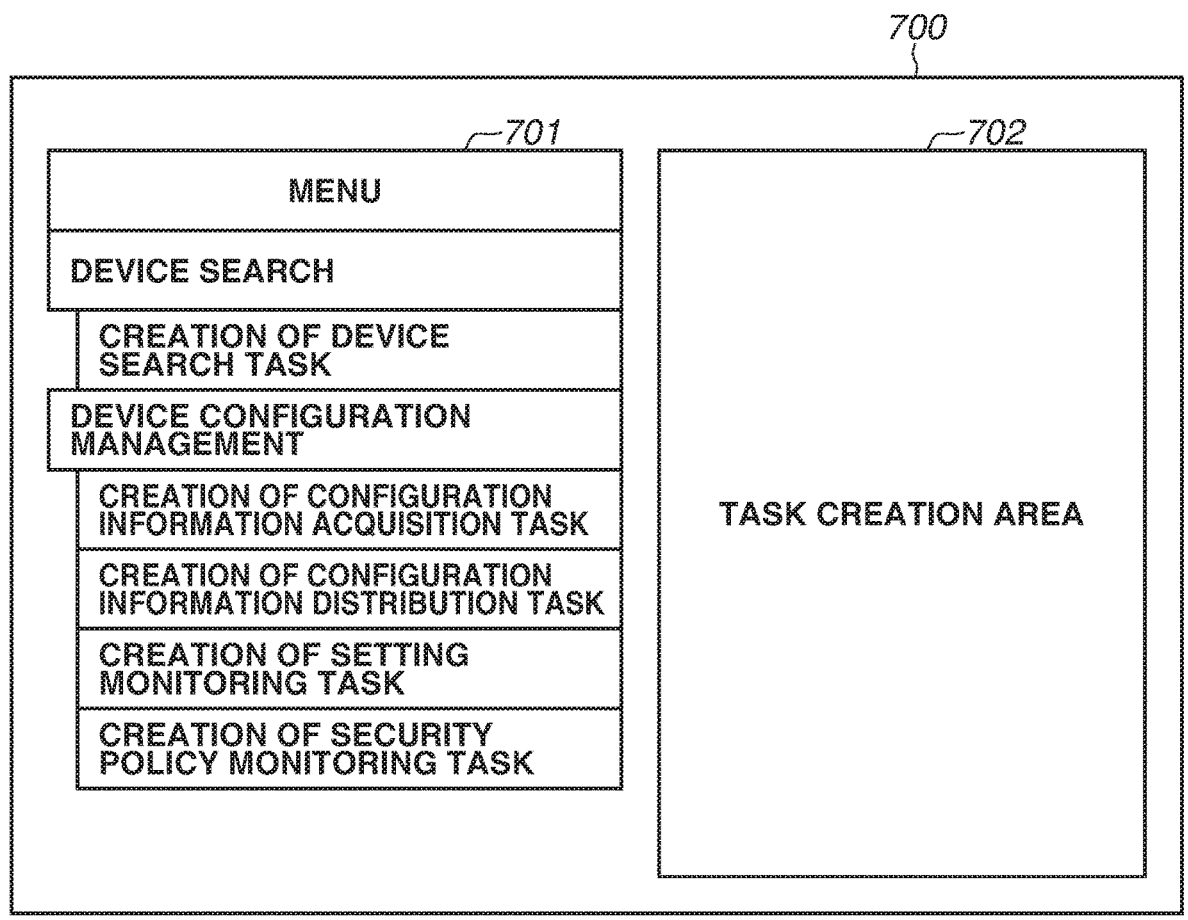
FIG. 7 is an example of a screen of a device management application.

FIG. 7 is a diagram illustrating an example of a screen of a device management application.

A screen of a device management application 700 as illustrated in FIG. 7 is displayed on the DSP 211 by the device management unit 30.

As illustrated in FIG. 7, the screen of the device management application 700 includes menus 701 and a task creation area 702.

According to one of the menus 701 selected by a user, the device management unit 30 displays in the task creation area 702 of the DSP 211 a screen for creating a task.

In the example of FIG. 7, the menus 701 include a "device search" menu provided by the device search unit 31 and a "device configuration management" menu provided by the device configuration management unit 33.

Further, the "device search" menu includes a "creation of device search task" menu.

Further, the "device configuration management" menu includes "creation of configuration information acquisition task", "creation of configuration information distribution task", "creation of setting monitoring task", and "creation of security policy monitoring task" menus.

The flows of setting monitoring task creation and security policy monitoring task creation are illustrated below.

Figure 8:
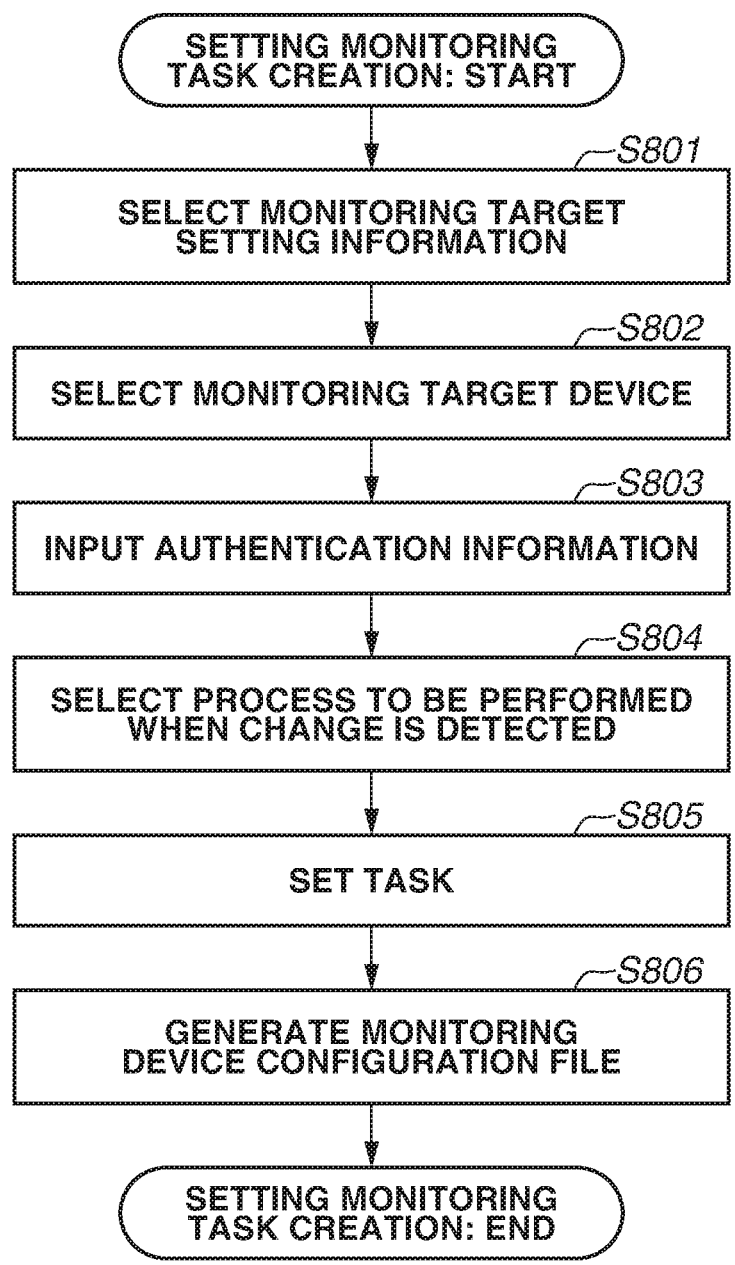
FIG. 8 is a flowchart illustrating an example of a setting monitoring task creation process.

First, with reference to FIGS. 8 to 10, the flow of setting monitoring task creation is illustrated.

FIG. 8 is a flowchart illustrating an example of a setting monitoring task creation process. The processing illustrated in the flowchart in FIG. 8 is executed by the device management unit 30 of the management server 1000. That is, the processing of the flowchart in FIG. 8 is achieved by the CPU 201 reading and executing a program recorded in the HDD 212.

In step S801, the device configuration management unit 33 acquires device configuration files saved in the device configuration data storage unit 35, displays in the task creation area 702 a screen for selecting device setting information to be a monitoring target as illustrated in FIG. 9, and receives from the user the selection of a device configuration file including setting information to be a monitoring target.

FIG. 9 is a diagram illustrating an example of the screen displayed in the task creation area 702 when device setting information to be a monitoring target is selected in step S801 in FIG. 8.

In FIG. 9, information such as a setting information name and an update date and time is displayed. The setting information name can identify a device configuration file and is, for example, the file name of the device configuration file. It is possible to select only one piece of setting information to be a monitoring target, and in the example of FIG. 9, setting information having the name "public space" is selected using a radio button. The setting information selected on the screen in FIG. 9 is setting information for monitoring in a setting monitoring task created in FIG. 8.

Next, in step S802, the device configuration management unit 33 displays in the task creation area 702 a screen for selecting a device to be a monitoring target as illustrated in FIG. 10, using a device search result as illustrated in FIG. 5, and receives from the user the selection of a device to be a monitoring target from among the found devices.

FIG. 10 is a diagram illustrating an example of the screen displayed in the task creation area 702 when a device to be a monitoring target is selected in step S802 in FIG. 8.

A list of devices illustrated in FIG. 10 is displayed based on the device search result in FIG. 5. It is possible to select a plurality of monitoring target devices, and in the example of FIG. 10, two devices DevA1 and DevA2 are selected. The device selected on the screen in FIG. 10 is a device of a monitoring target in the setting monitoring task created in FIG. 8.

Next, in step S803, the device configuration management unit 33 displays in the task creation area 702 a screen (not illustrated) for inputting authentication information and receives from the user the input of authentication information for communicating with the monitoring target device selected in step S802.

Next, in step S804, the device configuration management unit 33 displays in the task creation area 702 a screen (not illustrated) for selecting a process to be performed when a change is detected, and receives from the user the specifying of a process to be performed when a difference is detected between the setting information of the device and the monitoring target setting information selected in steps S801 and S802. In the present exemplary embodiment, specifically, it is possible to select at least one of three processes including "giving an email notification", "performing restoration", and "performing restoration and giving an email notification". The process selected at this time is a process to be executed when a difference is detected in the setting monitoring task created in FIG. 8.

Next, in step S805, the device configuration management unit 33 displays in the task creation area 702 a screen (not illustrated) for setting a task and receives from the user the input of the general settings of a task. Specifically, the device configuration management unit 33 receives settings such as the task name, the execution schedule of the task, the notification destination email address for the task execution result.

Next, in step S806, the device configuration management unit 33 generates a device configuration file (referred to as a "monitoring device configuration file") by deleting information unnecessary for monitoring from the device configuration file selected in step S801 and saves the generated monitoring device configuration file in the device configuration data storage unit 35 (e.g., FIGS. 17A and 18A).

Specifically, the information unnecessary for the setting monitoring task corresponds to information that is not a setting item, and a security policy (the details will be described later with reference to FIG. 17A). The user may be allowed to further select a setting item to actually be a monitoring target from among setting items included in the setting information selected in step S801 in FIG. 8. In this case, it is assumed that the setting items that are not selected as monitoring targets by the user are deleted in step S806 in FIG. 8 and are not included in the monitoring device configuration file.

As described above, the contents of the settings made in steps S801 to S806 are saved as task settings (monitoring settings) in the data storage unit 34 and read by the task management unit 32 at timing corresponding to the execution schedule specified in step S805, and the task is executed.

Figure 11:
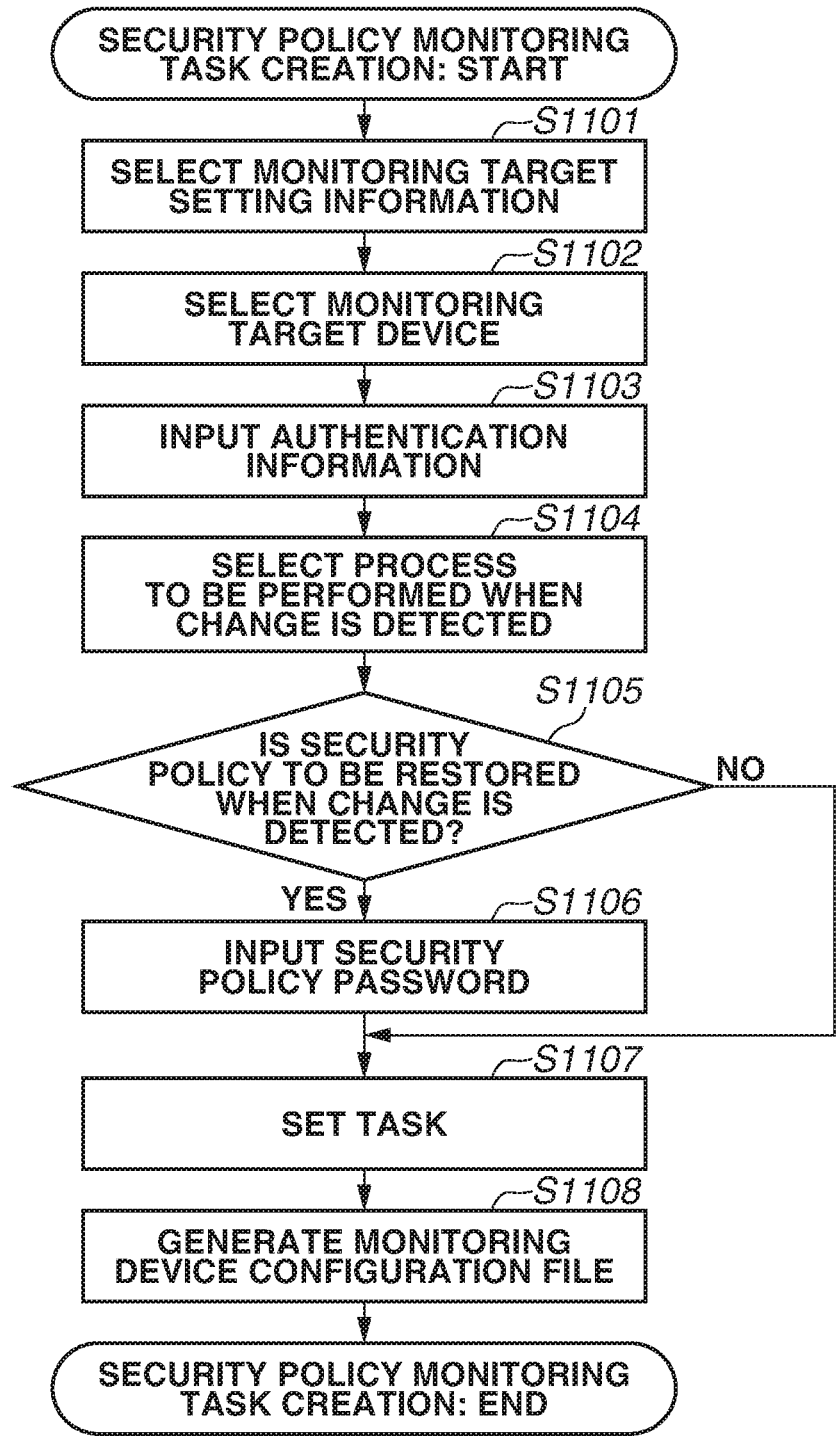
FIG. 11 is a flowchart illustrating an example of a security policy monitoring task creation process.

Next, with reference to FIGS. 11 to 14, the flow of security policy monitoring task creation is illustrated. FIG. 11 is a flowchart illustrating an example of a security policy monitoring task creation process. The processing illustrated in the flowchart in FIG. 11 is executed by the device management unit 30 of the management server 1000. That is, the processing of the flowchart in FIG. 11 is achieved by the CPU 201 reading and executing a program recorded in the HDD 212.

In step S1101, the device configuration management unit 33 acquires device configuration files saved in the device configuration data storage unit 35, displays in the task creation area 702 a screen for selecting device setting information to be a monitoring target as illustrated in FIG. 12, and receives from the user the selection of a device configuration file including a security policy to be a monitoring target.

FIG. 12 is a diagram illustrating an example of the screen displayed in the task creation area 702 when device setting information to be a monitoring target is selected in step S1101 in FIG. 11.

The screen illustrated in FIG. 12 is different from the screen illustrated in FIG. 9 in that a security policy version is displayed with respect to each piece of setting information. The security policy version corresponds to the portion 610 in the device configuration file. On the screen in FIG. 12, the device configuration management unit 33 does not list, among the device configuration files saved in the device configuration data storage unit 35, a device configuration file that does not include setting information regarding a security policy.

The setting information selected on the screen in FIG. 12 is setting information for monitoring in a security policy monitoring task created in FIG. 11.

Next, in step S1102, the device configuration management unit 33 displays in the task creation area 702 a screen for selecting a device to be a monitoring target as illustrated in FIG. 13, using a device search result as illustrated in FIG. 5, and receives from the user the selection of a device to be a monitoring target from among the found devices.

FIG. 13 is a diagram illustrating an example of the screen displayed in the task creation area 702 when a device to be a monitoring target is selected in step S1102 in FIG. 11.

The screen illustrated in FIG. 13 is different from the screen illustrated in FIG. 10 in that with respect to each device, a security policy version with which the device is compatible is displayed. Each device can apply security policies in a plurality of security policy versions. In the example of FIG. 13, the device DevA1 can apply a security policy in a version V1.20 or a security policy in a version V1.30.

If, in step S1101 in FIG. 11, the setting information "public space" corresponding to the security policy version V1.20 is selected as a monitoring target as illustrated in FIG. 12, a device incompatible with the security policy version V1.20 cannot be selected in step S1102. Thus, in the example of FIG. 13, the device "DevB1" compatible with the security policy version V1.00 is grayed out and cannot be selected.

The device selected on the screen in FIG. 13 is a device of a monitoring target in the security policy monitoring task created in FIG. 11.

The respective processes of steps S1103 and S1104 are similar to those of steps S803 and S804, in FIG. 8 and therefore are not described here.

Next, in step S1105, the device configuration management unit 33 determines whether, if the security policy of the device is different from the security policy included in the monitoring target setting information selected in step S1101, the security policy of the device is to be restored. Specifically, if "performing restoration" or "performing restoration and giving an email notification" is selected in step S1104, the device configuration management unit 33 determines that the security policy of the device is to be restored. If "giving an email notification" is selected, the device configuration management unit 33 determines that the security policy of the device is not to be restored.

If it is determined in step S1105 that the security policy of the device is not to be restored when a change is detected (No in step S1105), the processing immediately proceeds to step S1107.

If, on the other hand, it is determined in step S1105 that the security policy of the device is to be restored when a change is detected (Yes in step S1105), the processing proceeds to step S1106.

In step S1106, the device configuration management unit 33 displays in the task creation area 702 a screen for inputting a security policy password as illustrated in FIG. 14 and receives from the user the input of a security policy password. Then, the processing proceeds to step S1107.

FIG. 14 is a diagram illustrating an example of the screen displayed in the task creation area 702 when a security policy password is input in step S1106 in FIG. 11.

The example of FIG. 14 is an example where "DevA1" and "DevA2" are selected as monitoring target devices as illustrated in FIG. 13 in step S1102 in FIG. 11. On the screen for inputting a security policy password, an entry field for a security policy password is displayed with respect to each monitoring target device.

The process of step S1107 is similar to that of step S805 in FIG. 8 and therefore is not described here.

Next, in step S1108, the device configuration management unit 33 generates a monitoring device configuration file by deleting information unnecessary for monitoring from the device configuration file selected in step S1101 and saves the generated monitoring device configuration file in the device configuration data storage unit 35 (e.g., FIGS. 17B and 18B). Specifically, the information unnecessary for the security policy monitoring task corresponds to information that is not a setting item, various setting items other than the security policy, and the security policy password (the details will be described later with reference to FIGS. 17B and 18B).

As described above, the contents of the settings made in steps S1101 to S1108 are saved as task settings in the data storage unit 34 and read by the task management unit 32 at timing corresponding to the execution schedule specified in step S1107, and the task is executed.

Figure 15:
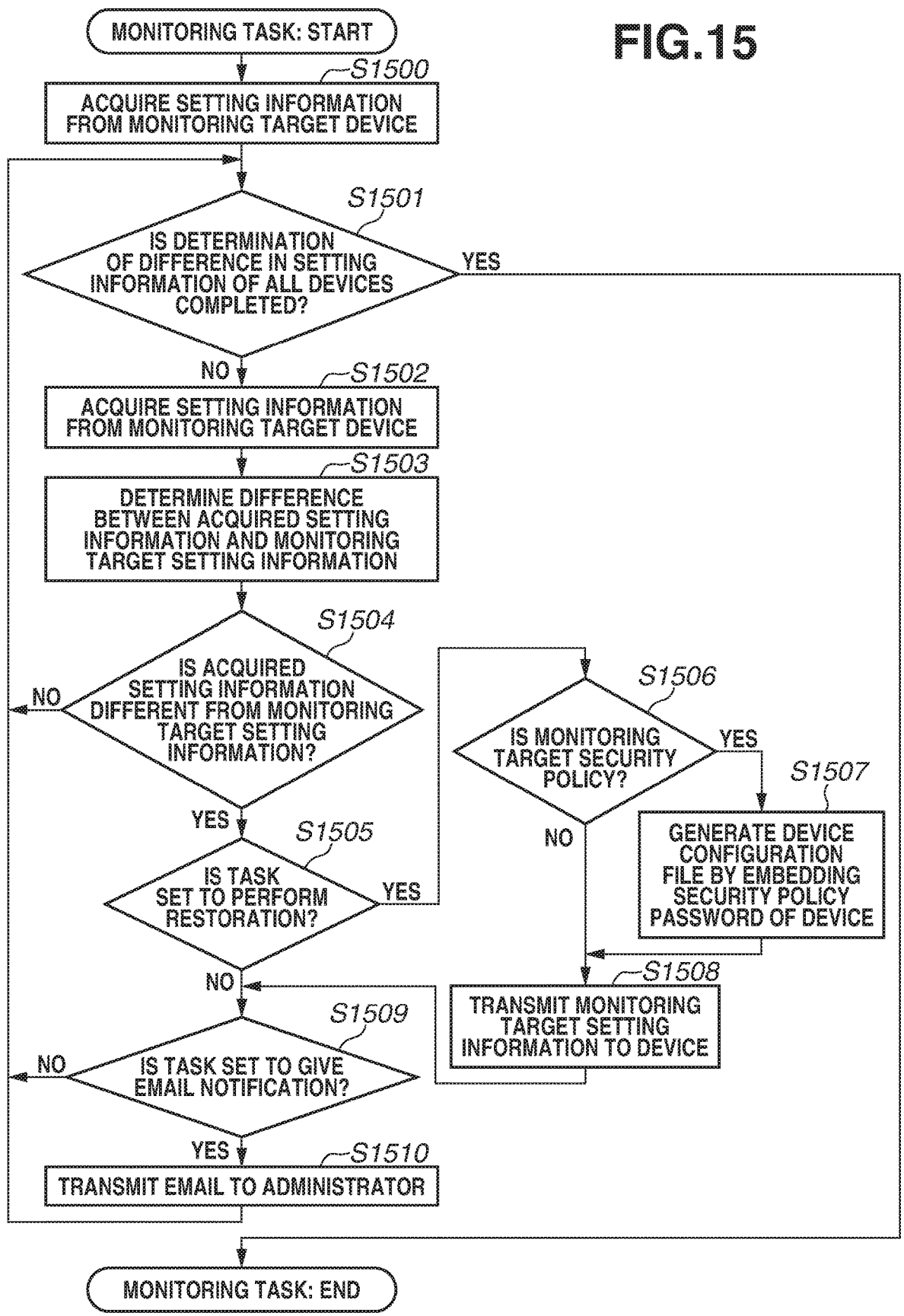
FIG. 15 is a flowchart illustrating an example of a monitoring task execution process.

Next, with reference to FIG. 15, the flow of monitoring task execution is illustrated.

Figure 16:
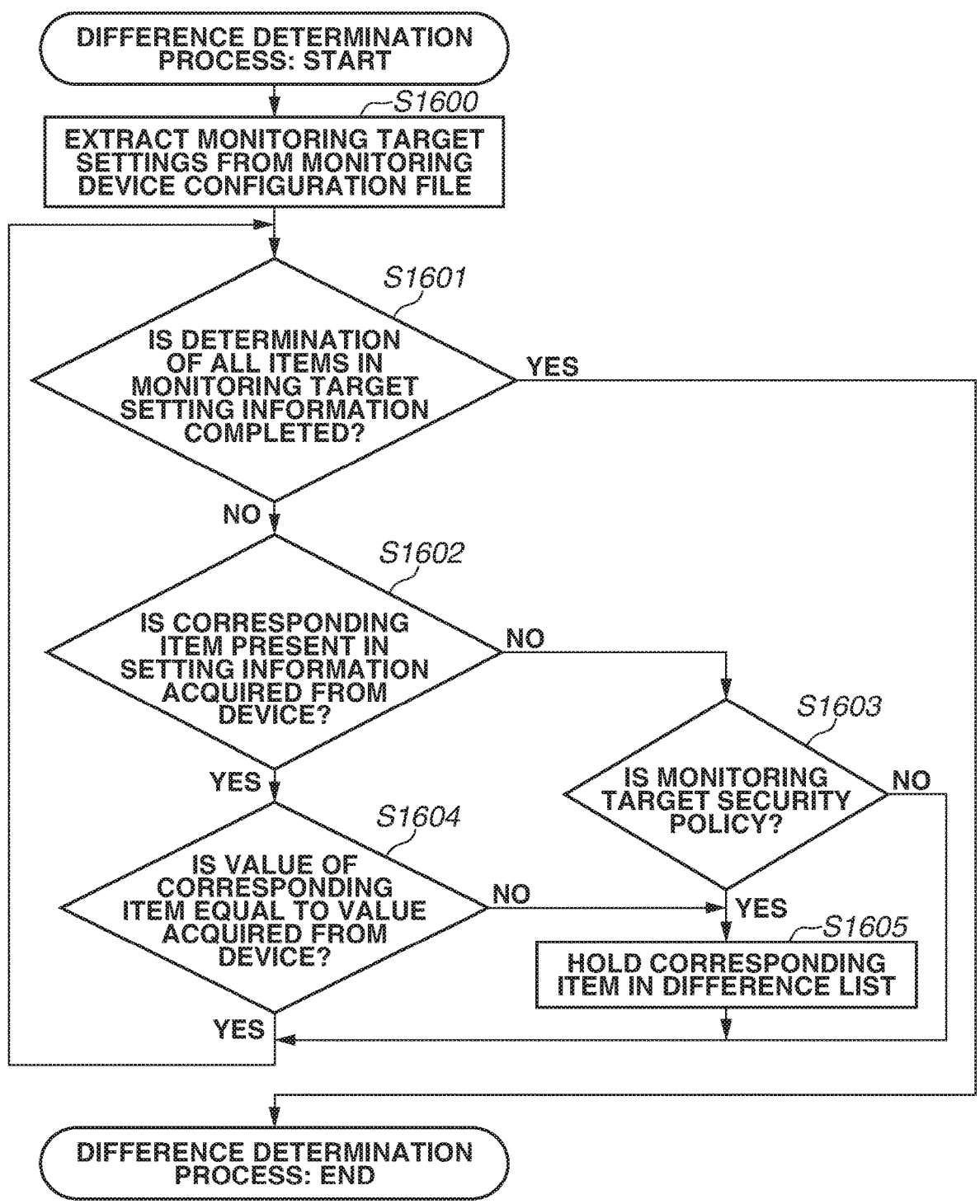
FIG. 16 is a flowchart illustrating an example of a difference determination process in a first exemplary embodiment.

FIG. 15 is a flowchart illustrating an example of a monitoring task execution process. The processing illustrated in the flowcharts in FIGS. 15 and 16 is executed by the device management unit 30 of the management server 1000. That is, the processing of the flowcharts in FIGS. 15 and 16 is achieved by the CPU 201 reading and executing a program recorded in the HDD 212. The processing in FIG. 15 is a monitoring task execution process common to both a setting monitoring task and a security policy monitoring task.

If receiving a task execution instruction from the task management unit 32, the device configuration management unit 33 starts the processing of this flowchart.

First, in step S1500, the device configuration management unit 33 acquires setting information in the format of a device configuration file from each device specified as a monitoring target in information of the task for which the execution instruction is given.

Next, in step S1501, the device configuration management unit 33 determines whether the process of determining a difference in the setting information of all the devices selected as the monitoring targets is completed. Then, if it is determined that there are devices for which a difference has not yet been determined (No in step S1501), the device configuration management unit 33 selects one of the devices for which a difference has not yet been determined (hereinafter, a "target device"), the processing proceeds to step S1502.

In step S1502, the device configuration management unit 33 acquires the setting information of the target device 2000 as a device configuration file via the device configuration service unit 36. At this time, the device configuration management unit 33 may acquire all the setting information of the target device 2000 or may acquire only the setting items included in the monitoring device configuration file generated in step S806 in FIG. 8 or step S1108 in FIG. 11.

Next, in step S1503, the device configuration management unit 33 determines whether the setting information acquired in step S1502 is the same as the monitoring target setting information (the setting information described in the monitoring device configuration file generated in step S806 in FIG. 8 or step S1108 in FIG. 11). The details of this determination process will be described later with reference to FIG. 16.

Next, in step S1504, the device configuration management unit 33 determines whether as the determination result of step S1503, there is a difference between the setting information in the monitoring device configuration file and the setting information acquired from the device (the setting information in the monitoring device configuration file is different from the setting information acquired from the device).

Then, if it is determined that there is no difference (No in step S1504), the processing immediately returns to step S1501.

If, on the other hand, it is determined that there is a difference (Yes in step S1504), the processing proceeds to step S1505.

In step S1505, the device configuration management unit 33 determines whether the setting of a process to be performed when a difference is detected (the setting made in step S804 in FIG. 8 or step S1104 in FIG. 11) is the setting for performing restoration. Specifically, in step S1505, if "performing restoration" or "performing restoration and giving an email notification" is set, the device configuration management unit 33 determines that restoration is to be performed. If "giving an email notification" is set, the device configuration management unit 33 determines that restoration is not to be performed.

Then, if it is determined that the setting for performing restoration is not made (No in step S1505), the processing immediately proceeds to step S1509.

If, on the other hand, it is determined that the setting for performing restoration is made (Yes in step S1505), the processing proceeds to step S1506.

In step S1506, the device configuration management unit 33 determines whether the monitoring task that is being executed is a security policy monitoring task or a setting monitoring task.

Then, if it is determined that the monitoring task that is being executed is not a security policy monitoring task (is a setting monitoring task) (No in step S1506), the processing immediately proceeds to step S1508.

If, on the other hand, it is determined that the monitoring task that is being executed is a security policy monitoring task (Yes in step S1506), the processing proceeds to step S1507.

In step S1507, the device configuration management unit 33 generates a device configuration file by rewriting the security policy password included in the device configuration file corresponding to the task that is being executed (generated in step S1108 in FIG. 11) and illustrated in the element 611 in FIG. 6, with the security policy password (input in step S1106 in FIG. 11) of the target device saved in the data storage unit 34 as a task setting of the task that is being executed. Then, the processing proceeds to step S1508.

In step S1508, the device configuration management unit 33 transmits the monitoring target setting information to the device configuration service unit 36 of the device. Specifically, in the case of a setting monitoring task, the device configuration management unit 33 transmits as the monitoring target setting information the device configuration file (generated in step S806 in FIG. 8) corresponding to the task that is being executed. In the case of a security policy monitoring task, the device configuration management unit 33 transmits as the monitoring target setting information the device configuration file generated in step S1507. Then, the processing proceeds to step S1509.

Next, in step S1509, the device configuration management unit 33 determines whether the setting of a process to be performed when a difference is detected (the setting made in step S804 in FIG. 8 or step S1104 in FIG. 11) is the setting for giving an email notification. Specifically, in step S1509, if "giving an email notification" or "performing restoration and giving an email notification" is set, the device configuration management unit 33 determines that an email notification is to be given. If "performing restoration" is set, the device configuration management unit 33 determines that an email notification is not to be given.

Then, if it is determined that the setting for giving an email notification is not made (No in step S1509), the processing immediately returns to step S1501.

If, on the other hand, it is determined that the setting for giving an email notification is made (Yes in step S1509), the processing proceeds to step S1510.

In step S1510, the device configuration management unit 33 transmits, to the destination information (the email address) set in the settings of the task (the settings made in step S805 in FIG. 8 or step S1107 in FIG. 11), an email indicating that the setting information of the target device is different from the monitoring target setting information (selected in step S801 in FIG. 8 or step S1101 in FIG. 11) corresponding to the task that is being executed. Then, the processing returns to step S1501.

Further, if it is determined in step S1501 that the determination of the setting information of all the devices is completed (Yes in step S1501), the device configuration management unit 33 ends the task process that is being executed.

In the example of FIG. 15, in step S1510, an email notification is given to the administrator with respect to each device. Alternatively, an email notification of the results of monitoring a plurality of devices may be given at once. For example, if it is determined that the determination of the setting information of all the devices is completed (Yes in step S1501), an email notification of the results of monitoring all the devices may be given at once.

With reference to FIG. 16, the flow of the difference determination process in step S1503 in FIG. 15 is illustrated below.

FIG. 16 is a flowchart illustrating an example of the difference determination process in step S1503 in FIG. 15 in the first exemplary embodiment.

In step S1600, the device configuration management unit 33 extracts all the setting items as monitoring targets included in the device configuration file (generated in step S806 in FIG. 8 or step S1108 in FIG. 11) corresponding to the task that is being executed.

Next, in step S1601, the device configuration management unit 33 confirms whether the determination of whether there is a difference in all the setting items extracted in step S1600 and included in the device setting information is completed. Then, if it is determined that there is a setting item for which a difference has not yet been determined (No in step S1601), the processing proceeds to step S1602.

In step S1602, the device configuration management unit 33 determines whether the setting item for which a difference is to be determined is present in the setting information of the device acquired in step S1502 in FIG. 15. Then, if it is determined that the setting item for which a difference is to be determined is not present (No in step S1602), the processing proceeds to step S1603.

In step S1603, the device configuration management unit 33 confirms whether the monitoring task that is being executed is security policy monitoring or setting monitoring.

Then, if it is determined that the monitoring task that is being executed is not security policy monitoring (is setting monitoring) (No in step S1603), the processing immediately returns to step S1601. If a setting is present in the monitoring target setting information but is not present in the setting information of the device, this means that the device does not include the setting, and a function regarding the setting cannot be used in the first place. Thus, it is considered that the setting does not need to be monitored. Thus, the device configuration management unit 33 determines that this case is equivalent to a case where there is no difference in the item.

If, on the other hand, it is determined in step S1603 that the monitoring task that is being executed is security policy monitoring (Yes in step S1603), the device configuration management unit 33 determines that there is a difference in the item. Then, the processing proceeds to step S1605. The reason for this is as follows. If a security policy is present in the monitoring target setting information but is not present in the setting information of the device, this means that the device is not compatible with the security policy. Thus, it is considered that this can lead to a security hole.

In step S1605, the device configuration management unit 33 saves in the data storage unit 34 the item in which there is a difference according to the determination. This information is used to notify by email the administrator of information of the difference in step S1510 in FIG. 15. Then, the processing returns to step S1601.

Further, if it is determined in step S1602 that the setting item for which a difference is to be determined is present in the setting information of the device acquired in step S1502 in FIG. 15 (Yes in step S1602), the processing proceeds to step S1604.

In step S1604, the device configuration management unit 33 determines whether the setting values of the item are equal. Then, if it is determined that the setting values of the item are not equal (No in step S1604), the device configuration management unit 33 determines that there is a difference in the item. Then, the processing proceeds to step S1605.

If, on the other hand, it is determined that the setting values of the item are equal (Yes in step S1604), the device configuration management unit 33 determines that there is no difference in the item. Then, the processing returns to step S1601.

Then, if it is determined in step S1601 that the determination of all the setting items in the device setting information is completed (Yes in step S1601), the processing of this flowchart ends.

A specific description is given below by illustrating, in FIGS. 17A, 17B, 18A, and 18B, examples of the monitoring device configuration file generated in step S806 in FIG. 8 or step S1108 in FIG. 11.

FIG. 17A is a diagram illustrating an example of the monitoring device configuration file for the setting monitoring task generated in step S806 in FIG. 8.

The example illustrated in FIG. 17A is an example of the setting monitoring task. Thus, the description of the security policy as illustrated in the element 610 in FIG. 6 is deleted as not being a monitoring target in step S806 in FIG. 8 and is not included in FIG. 17A. Similarly, if an element 1701, which represents various pieces of information of the device, is compared with the element 601 in FIG. 6, information specific to the device, such as the device name and the serial number, is unnecessary for correcting the settings in step S1508 in FIG. 15 and therefore is deleted in step S806 in FIG. 8. The setting items in the element 1701 cannot be changed by the user, and therefore, the element 1701 is not a monitoring target. Thus, only a portion 1702 is a monitoring target in FIG. 17A.

A description of the difference determination process in a case where for the monitoring device configuration file illustrated in FIG. 17A, the device configuration file acquired from the device is that in FIG. 6 is given below.

If the element 602 in FIG. 6 is compared with the element 1702 in FIG. 17A, "<AutoSleepTime>" and "<DeepSleep>" are present as setting items in both the elements 602 and 1702. Thus, in the branch of step S1602 in FIG. 16, the processing proceeds to step S1604. However, the setting value of "<DeepSleep>" is "Enabled" in the element 602, whereas the setting value of "<DeepSleep>" is "Disabled" in the element 1702. Thus, the setting values are different from each other. Thus, it is determined in the branch of step S1604 that there is a difference. Then, the processing proceeds to step S1605.

FIG. 17B is a diagram illustrating an example of the monitoring device configuration file for the security policy monitoring task generated in step S1108 in FIG. 11.

The example illustrated in FIG. 17B is an example of the security policy monitoring task. Thus, the description of the settings as illustrated in the element 602 in FIG. 6 other than the security policy is deleted as not being a monitoring target in step S1108 in FIG. 11 and is not included in FIG. 17B. Further, in a portion 1704, which represents a security policy password, the security policy password is deleted in step S1108 in FIG. 11 and is blank in FIG. 17B, because a security policy password is additionally described with respect to each target device in step S1507 in FIG. 15.

A description of the difference determination process in a case where for the monitoring device configuration file in FIG. 17B, the device configuration file acquired from the device is that in FIG. 6 is given below.

If the element 612 in FIG. 6 is compared with an element 1705 in FIG. 17B, 10 items with IDs "I0001" to "I0010" are present as security policy items in both the elements 612 and 1705. Thus, in the branch of step S1602 in FIG. 16, the processing proceeds to step S1604. However, the setting value of the item with the ID "I0001" is "false" in the element 612, whereas the setting value of the item with the ID "I0001" is "true" in the element 1705. Thus, the setting values are different from each other. Thus, it is determined in the branch of step S1604 in FIG. 16 that there is a difference. Then, the processing proceeds to step S1605.

FIG. 18A is a diagram illustrating an example of the monitoring device configuration file for the setting monitoring task generated in step S806 in FIG. 8. Portions similar to those of FIG. 17A are designated by the same numerals and are not described here.

The example illustrated in FIG. 18A is an example of the monitoring device configuration file for the setting monitoring task.

A description of the difference determination process in a case where for the monitoring device configuration file in FIG. 18A, the device configuration file acquired from the device is that in FIG. 6 is given below.

If the element 602 in FIG. 6 is compared with an element 1802 in FIG. 18A, in setting items, the values of "<AutoSleepTime>" and "<DeepSleep>" are the same, but "<AutoShutdownTime>" is not present in FIG. 6. Thus, in the branch of step S1602 in FIG. 16, the processing proceeds to step S1603. However, since this is a setting monitoring task, it is determined in step S1603 that there is no difference. Then, the processing proceeds to step S1601.

FIG. 18B is a diagram illustrating an example of the monitoring device configuration file for the security policy monitoring task generated in step S1108 in FIG. 11. Portions similar to those of FIG. 18A are designated by the same numerals and are not described here.

A description of the difference determination process in a case where for the monitoring device configuration file in FIG. 18B, the device configuration file acquired from the device is that in FIG. 6 is given below.

If the element 612 in FIG. 6 is compared with an element 1805 in FIG. 18B, in security policy items, the setting values of IDs "I0001" to "I0010" are the same, but an item with an ID "I0011" is not present in FIG. 6. Thus, in the branch of step S1602 in FIG. 16, the processing proceeds to step S1603. Since this is a security policy monitoring task, it is determined in step S1603 in FIG. 16 that there is a difference. Then, the processing proceeds to step S1605.

As illustrated above, according to the first exemplary embodiment, if a setting item included in monitoring target setting information is not present in setting information of a monitoring target device, then based on whether a setting is monitored or a security policy is monitored, it is determined whether to execute a process to be performed when a change is detected. With this configuration, even if both two types of monitoring functions, namely setting monitoring and security policy monitoring, are to be achieved, it is determined, based on the type of a monitoring target and the content of a detected change, whether to notify an administrator of the change. Thus, it is possible to reduce an unnecessary notification to the administrator, while certainly notifying the administrator of a change in which the security risk is high. Further, when the value of an item in which the security risk is high should be changed back to the previous value, it is possible to certainly change the value back to the previous value. That is, it is possible to reduce an unnecessary notification to the administrator, while achieving the detection and the appropriate handling of a change with high accuracy, taking the security risk into account. Thus, it is possible to reduce influence on the monitoring work of the administrator and suppress a rise in management costs. Further, it is possible to eliminate a threat to the security of a network device due to an inadvertent change in a security policy.

In a second exemplary embodiment, a description of a configuration in which in security policy monitoring, a security policy is monitored more strictly, taking the security policy version into account is given. Only the differences from the first exemplary embodiment are described below.

Figure 19:
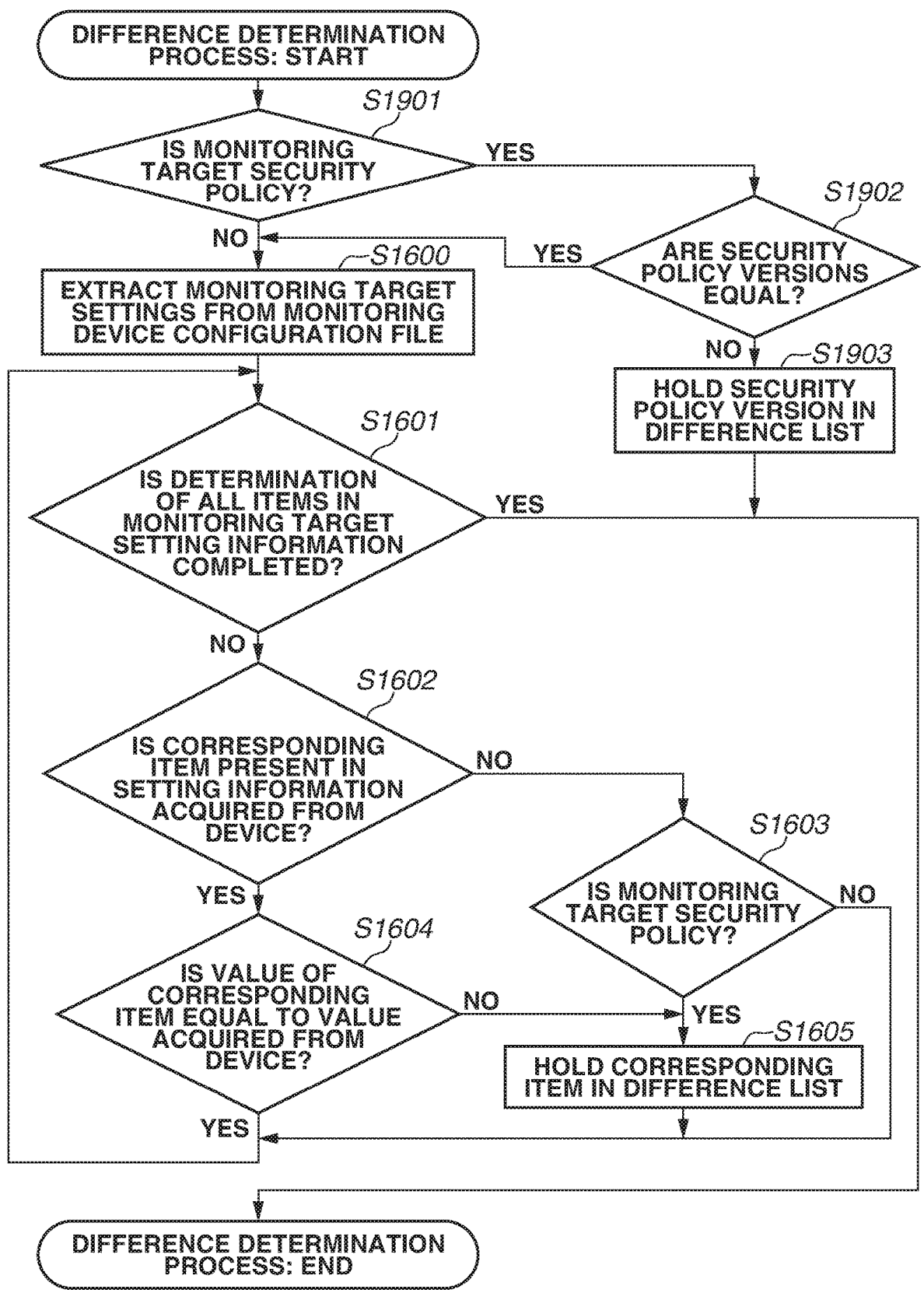
FIG. 19 is a flowchart illustrating an example of a difference determination process in a second exemplary embodiment.

FIG. 19 is a flowchart illustrating an example of the difference determination process in step S1503 in FIG. 15 in the second exemplary embodiment. Steps similar to those in FIG. 16 are designated by the same step numbers and are not described here.

The processing illustrated in the flowchart in FIG. 19 is executed by the device management unit 30 of the management server 1000. That is, the processing of the flowchart in FIG. 19 is achieved by the CPU 201 reading and executing a program recorded in the HDD 212.

In step S1901, the device configuration management unit 33 confirms whether the monitoring task that is being executed is security policy monitoring or setting monitoring.

Then, if it is determined that the monitoring task that is being executed is not security policy monitoring (is setting monitoring) (No in step S1901), the processing proceeds to step S1600.

If, on the other hand, it is determined that the monitoring task that is being executed is security policy monitoring (Yes in step S1901), the processing proceeds to step S1902.

In step S1902, the device configuration management unit 33 makes a comparison to determine whether the security policy version information of a monitoring device configuration file corresponding to the monitoring task that is being executed is the same as the security policy version of the device configuration file acquired in step S1502 in FIG. 15. Then, if it is determined that the security policy versions are equal (the same) (Yes in step S1902), the processing proceeds to step S1600.

If, on the other hand, it is determined that the security policy versions are not equal (there is a difference between the security policy versions) (No in step S1902), the processing proceeds to step S1903. In step S1903, the device configuration management unit 33 saves, in a difference list held in the data storage unit 34, the fact that there is a difference between the security policy versions. This information is used to notify by email the administrator of information of the difference in step S1510 in FIG. 15.

FIG. 20 is a diagram illustrating an example of the monitoring device configuration file generated in step S1108 in FIG. 11. Portions similar to those of FIG. 17 are designated by the same numerals and are not described here.

A description of the difference determination process in a case where for the monitoring device configuration file in FIG. 20, the device configuration file acquired from the device is that in FIG. 6 is given below.

First, a monitoring target in the monitoring device configuration file illustrated in FIG. 20 is the security policy. Thus, in the branch of step S1901 in FIG. 19, the processing proceeds to step S1902. Next, if the element 610 in FIG. 6 is compared with an element 2003 in FIG. 20, the security policy versions are different from each other. Thus, in the branch of step S1902 in FIG. 19, the processing proceeds to step S1903. In step S1903, the device configuration management unit 33 records the fact that there is a difference between the security policy versions, and the difference determination process ends.

A description of the difference from the first exemplary embodiment in the processing of the device configuration management unit 33 illustrated in FIG. 15 in a case where the fact that there is a difference between the security policy versions is recorded in step S1903 is given.

Specifically, in step S1507, the device configuration management unit 33 embeds the security policy password into a monitoring device configuration file including a setting item and a setting value corresponding to the security policy version information set in the monitoring task. Further, in step S1510, using the destination information set in the task, the device configuration management unit 33 gives a notification indicating that the version information of the security policy set as a monitoring target is changed.

According to the second exemplary embodiment, in security policy monitoring, when security policy versions are different, it is determined that there is a difference. With this configuration, it is possible to more strictly ensure the same security policy among a plurality of devices. When it is determined that the versions are different, differences in the items and the setting values of the security policy may be further detected. Then, in the notification in step S1510, a notification of not only a change in the version information of the security policy but also an item and a setting value in which differences are detected may be given.

In the above exemplary embodiments, a configuration has been described in which a setting monitoring task for monitoring a general setting and a security policy monitoring task for monitoring a security policy are generated, and each task is executed, thereby monitoring setting information of a device. Alternatively, the configuration may be such that a single monitoring task for monitoring both a general setting and a security policy may be generated, and the task may be executed, whereby it is possible to monitor setting information of a device. In the case of this configuration, in step S1506 in FIG. 15, if the monitoring targets of the monitoring task that is being executed include a security policy, the determination is Yes. If the monitoring targets do not include a security policy, the determination is No. Further, in step S1603 in FIGS. 16 and 19, with respect to each loop of steps S1601 to S1605, a difference is determined based on whether an item of a determination target in the loop is an item of general setting information or an item of security policy setting information. That is, in a loop where an item of general setting information is a determination target, the determination is No in step S1603, and it is determined that "there is no difference". On the other hand, in a loop where an item of security policy setting information is a determination target, the determination is Yes in step S1603, and it is determined that "there is a difference".

As illustrated above, according to the exemplary embodiments of the present invention, even if a plurality of types of pieces of setting information are to be monitored simultaneously, it is possible to reduce unnecessary processing, while appropriately handling a change in which the security risk is high. Thus, even if a general setting and the setting of a security policy are to be remotely monitored simultaneously, it is possible to reduce unnecessary processing such as an unnecessary notification to an administrator, while appropriate handling such as giving a notification or updating a setting value is possible with regard to a change in which the security risk is high.

The configurations and the contents of the above various types of data are not limited to these, and the above various types of data may have various configurations and contents according to the use and purpose.

While exemplary embodiments have been described above, aspects of the present invention can employ embodiments as, for example, a system, an apparatus, a method, a program, and a storage medium. Specifically, aspects of the present invention may be applied to a system including a plurality of devices or may be applied to an apparatus including a single device.

Further, all the configurations obtained by combining the above exemplary embodiments are also included in the aspects of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-136664, filed Jul. 8, 2015, which is hereby incorporated by reference herein in its entirety.

What is claimed is:

1. A monitoring apparatus for communicating with a network device compatible with a management function for preventing a value of a particular item from being changed without predetermined authentication, the monitoring apparatus comprising:
a storage storing one or more device configuration files;
a memory storing instructions, and
at least one processor executing instructions causing the monitoring apparatus to:
create a monitoring task for monitoring setting information of a network device of a monitoring target by selecting, as setting information corresponding to the monitoring task, one of the one or more device configuration files from the storage, wherein the setting information includes a plurality of items and values of the items;
control execution of the monitoring task;
when the monitoring task is executed, acquire the setting information of the network device of the monitoring target;
compare values of an item included in both the acquired setting information and setting information corresponding to the monitoring task;
determine whether a difference between the acquired setting information and the setting information corresponding to the monitoring task exists based on the comparing between the acquired setting information and the setting information corresponding to the monitoring task;
determine, in a case where the monitoring task is a task for monitoring regarding the management function and an item included in the setting information corresponding to the monitoring task is not included in the acquired setting information, that a difference between the acquired setting information and the setting information corresponding to the monitoring task exists; and
in a case where the difference exists, execute a process according to a monitoring setting of the monitoring task,
wherein, even if an item included in the setting information corresponding to the monitoring task is not included in the acquired setting information, it is determined that no difference between the acquired setting information and the setting information corresponding to the monitoring task exists in a case where the monitoring task is not a task for monitoring regarding the management function.

2. The monitoring apparatus according to claim 1, wherein the one or more processor executed according to the monitoring setting includes at least one of a first process for providing a notification of the determined difference and a second process for updating the determined difference.

3. The monitoring apparatus according to claim 1, wherein a password for the management function is required for the predetermined authentication,
wherein in a case where the monitoring setting of the monitoring task includes a setting for updating the determined difference, using the setting information corresponding to the monitoring task, the password for the management function is set in the monitoring task, and
wherein, in a case where the difference exists, the updating of the monitoring target using both the password and the setting information corresponding to the monitoring task is executed as the process according to the monitoring setting.

4. The monitoring apparatus according to claim 1, wherein the instructions further cause the monitoring apparatus to:
in a case where the monitoring task is a task for monitoring regarding the management function, compare version information indicated by the acquired setting information with version information indicated by the setting information corresponding to the monitoring task; and
determine that a difference between the acquired setting information and the setting information corresponding to the monitoring task exists, in a case where the version information indicated by the setting information corresponding to the monitoring task is not equal to the version information indicated by the acquired setting information;
wherein, even if the version information indicated by the setting information corresponding to the monitoring task is equal to the version information indicated by the acquired setting information, it is further determined that a difference between the acquired setting information and the setting information corresponding to the monitoring task exists, in a case where an item included in the setting information corresponding to the monitoring task is not included in the acquired setting information.

5. The monitoring apparatus according to claim 1, wherein the network device is any of an image forming apparatus, a network camera, a digital medical device, a robot, an in-car terminal, an air-conditioning device, or a network household electrical appliance.

6. A control method for a monitoring apparatus for communicating with a network device compatible with a management function for preventing a value of a particular item from being changed without predetermined authentication, the control method comprising:
storing one or more device configuration files;
creating a monitoring task for monitoring setting information of a network device of a monitoring target by selecting, as setting information corresponding to the monitoring task, one of the one or more device configuration files, wherein the setting information includes a plurality of items and values of the items;
controlling execution of the monitoring task;
acquiring, when the monitoring task is executed, the setting information of the network device of the monitoring target;
comparing values of an item included in both the acquired setting information and setting information corresponding to the monitoring task;
determining whether a difference between the acquired setting information and the setting information corresponding to the monitoring task exists based on the comparing between the acquired setting information and the setting information corresponding to the monitoring task;
determining, in a case where the monitoring task is a task for monitoring regarding the management function and an item included in the setting information corresponding to the monitoring task is not included in the acquired setting information, that a difference between the acquired setting information and the setting information corresponding to the monitoring task exists; and executing, in a case where it is determined that a difference exists, a process according to a monitoring setting of the monitoring task, wherein, even if an item included in the setting information corresponding to the monitoring task is not included in the acquired setting information, it is determined that no difference between the acquired setting information and the setting information corresponding to the monitoring task exists in a case where the monitoring task is not a task for monitoring regarding the management function.

7. A non-transitory computer readable storage medium storing computer executable instructions for causing a computer to execute a control method for a monitoring apparatus for communicating with a network device compatible with a management function for preventing a value of a particular item from being changed without predetermined authentication, the control method comprising:

storing one or more device configuration files;

creating a monitoring task for monitoring setting information of a network device of a monitoring target by selecting, as setting information corresponding to the monitoring task, one of the one or more device configuration files, wherein the setting information includes a plurality of items and values of the items;

controlling execution of the monitoring task;

acquiring, when the monitoring task is executed, the setting information of the network device of the monitoring target;

comparing values of an item included in both the acquired setting information and setting information the monitoring task;

determining whether a difference between the acquired setting information and the setting information corresponding to the monitoring task exists based on the comparing between the acquired setting information corresponding to and the setting information corresponding to the monitoring task;

determining, in a case where the monitoring task is a task for monitoring regarding the management function and an item included in the setting information corresponding to the monitoring task is not included in the acquired setting information, that a difference between the acquired setting information and the setting information corresponding to the monitoring task exists; and executing, in a case where it is determined that a difference exists, a process according to a monitoring setting of the monitoring task, wherein, even if an item included in the setting information corresponding to the monitoring task is not included in the acquired information, it is determined that no difference between the acquired setting information and the setting information corresponding to the monitoring task exists in a case where the monitoring task is not a task for monitoring regarding the management function.

* * * * *